(12) United States Patent
Hohn et al.

(10) Patent No.: US 6,455,597 B2
(45) Date of Patent: Sep. 24, 2002

(54) CATALYTIC PARTIAL OXIDATION — PARTICULATE CATALYSTS

(75) Inventors: Keith L. Hohn, Manhattan, KS (US); Lanny D. Schmidt, Minneapolis, MN (US); Sebastian C. Reyes, Branchburg, NJ (US); Jennifer S. Feeley, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/791,985

(22) Filed: Feb. 23, 2001

Related U.S. Application Data

(63) Continuation of application No. 09/430,803, filed on Oct. 29, 1999, now abandoned.

(51) Int. Cl.$^7$ .............................. C07C 27/00; C07C 1/02
(52) U.S. Cl. ........................ 518/715; 518/700; 518/702; 518/703; 252/373

(58) Field of Search ................................. 518/700, 702, 518/703, 715; 252/373

(56) References Cited

U.S. PATENT DOCUMENTS 5,143,647 A * 9/1992 Say et al. .................... 252/373

FOREIGN PATENT DOCUMENTS

EP 0303438 * 2/1989

OTHER PUBLICATIONS

Yanlai Chu et al., "Partial oxidation of methane to carbon monoxide and hydrogen over $NiO/La_2O_3/\gamma-Al_2O_3$ catalyst," Applied Catalysis A: General 134 (1966) 67–80.

* cited by examiner

Primary Examiner—Jafar Parsa
(74) Attorney, Agent, or Firm—Charles J. Brumlik

(57) ABSTRACT

Catalytic partial oxidation is effected in the presence of a supported, Group VIII metal catalyst by reacting a light hydrocarbon with an oxygen containing gas, the catalyst support being in a preferred size range.

11 Claims, No Drawings

CATALYTIC PARTIAL OXIDATION — PARTICULATE CATALYSTS

This application is based on a Continuation of U.S. Ser. No. 09/430,803 filed Oct. 29, 1999 now abandoned.

FIELD OF THE INVENTION

This invention relates to a catalytic partial oxidation process wherein a light hydrocarbon, e.g., methane, is converted to synthesis gas, carbon monoxide and hydrogen. More particularly, this invention relates to a particular particulate catalyst for the catalytic partial oxidation process.

BACKGROUND OF THE INVENTION

Catalytic partial oxidation is a known process herein a light hydrocarbon, for example, a $C_1$–$C_4$ alkane or hydrocarbon, or more likely methane, as may be in or obtained from natural gas is converted catalytically in the presence of an oxygen containing stream to synthesis gas. The following stoichiometric equation exemplifies the reaction:

$$CH_4 + \tfrac{1}{2}O_2 \rightarrow 2H_2 + CO$$

The reaction is particularly attractive in gas to liquids projects wherein natural gas in converted to synthesis gas, and the synthesis gas is converted to heavy hydrocarbons, C2+, via the Fischer-Tropsch process. Because the stoichiometric reactant ratio for the Fischer-Tropsch process with non-shifting catalysts is about 2.1/1, the synthesis gas produced by catalytic partial oxidation is a particularly valuable feed for the Fischer-Tropsch process.

The catalytic partial oxidation process has been reported in a number of recently published patent applications, e.g., EP 0 576 096 A2. Nevertheless, there is a desire to improve both the yield and selectivity of the process, particularly regarding hydrogen selectivity, and thereby further the commercial prospects for the process.

SUMMARY OF THE INVENTION

The invention may be exemplified by a catalytic partial oxidation process comprising the reaction of a light hydrocarbon, e.g., a $C_1$–$C_4$ alkyl, preferably methane, by itself, or as a component of natural gas, with oxygen in the presence of a supported, Group VIII noble or non-noble metal catalyst, the support comprising particulate solids of a particular size range.

The prior art in the area of catalytic partial oxidation does not suggest that a particular particle size range exists in which the process becomes highly efficient with regard to hydrogen selectivity. The prior art suggests that while particulates may be used din the catalytic partial oxidation process, it is preferred to use monoliths or foams as the catalyst support. The reasoning being that foams, for example, readily conduct heat because of their bi-continuous structure, whereas particles only conduct heat at narrow point contacts, and therefore, are thought to have a lower overall axial thermal conductivity than foams or monoliths.

Nevertheless, the efficiency of the process and an aspect of this invention is the adequate management of both the heat conductivity, or heat flux along the catalyst bed and the number of active catalytic sites that can be placed on the external surface of the support per unit volume of the reactor.

Due to their large porosity, catalytic support materials, such as foams and monoliths have relatively poorer axial and radial heat conductivity than smaller particulates. Also, the number of active catalytic sites that can be placed on a support is proportional to the surface to volume ratio (S/V), i.e., the external, geometric surface to volume ratio of a granular material, excluding the intra particle surface area, and therefore, smaller and smaller particles would seem to be preferred. However, very small particles do not lend themselves to good heat conductivity in the bed, heat being transferred by point contacts and by radiation along in the catalyst bed. Consequently, there is a need to balance the competing aspects of the overall axial thermal conductivity of the bed with the surface density of catalytic sites in order to achieve the necessary process efficiency.

The surface area to volume (S/V) ratio (also referred to as the geometric surface to volume ratio) of a catalytic bed, e.g., a packed bed, can be readily determined from a knowledge of the particle size and the porosity of the particulate bed. For example, the S/V ratio of a packed bed of spherical particles or particles that can be assumed to be, or described as spherical, can be described by $S/V = 3(1-\varnothing)/r_p$; where $\varnothing$ is the porosity of the bed and $r_p$ is the particle radius. Because packed beds can contain a range of particle sizes, the particle radius can be selected as the radius of the average particle size (i.e., volumetric average particle size). For packed beds, $\varnothing$ ranges from about 0.3 to about 0.5 and the preferred surface to volume ratio is about 15–230 $cm^{-1}$. However, a more preferred surface to volume range is 18–140 $cm^{-1}$, more preferably 18–105 $cm^{-1}$.

Preferred particles have a diameter ranging from about 200–2000 microns, more preferably about 400–1600 microns, and still more preferably about 400–1200 microns. The particles may be spherical or other shapes which can be described or approximated by a diameter and are generally described as being granular.

Thus, the process balances surface to area ratio, as that ratio has been defined, with the overall bed (or packing) thermal conductivity which is described in D. Kunii and J. M. Smith, AlChE J. 6(1), p. 71–78 (1960), incorporated herein by reference.

The catalyst support is generally a difficult to reduce refractory metal oxide, such as alumina, particularly alpha alumina, zirconia, titania, hafnia, silica, silica-alumina; rare earth modified refractory metal oxides, where the rare earth may be any rare earth metal, e.g., lanthanum, yttrium; alkali earth metal modified refractory metal oxides; and these materials may be generally categorized as materials having a substantially stable surface area at reaction conditions, for example, a surface area that is not substantially altered by reaction conditions, or altered in any way that affects the reaction.

Because thermal conductivity is one of the competing elements for the nature of the catalyst support, the support having better thermal conductivity can be used in the form of smaller average particle sizes. Nevertheless, the S/V ratios given above generally take this element into account and apply for all preferred supports, i.e., zirconia and alpha alumina, particularly preferred being alpha alumina, and rare earth stabilized alumina. The preferred support particles generally have a low total surface area, e.g., <20 $m^2/gm$, and microporosity is not important to the process.

The catalytic metal is preferably a Group VIII noble metal, e.g., platinum, iridium, rhodium, osmium, ruthenium, although nickel may also be used as the catalytic metal. Rhodium, however, is most preferred as the catalytic metal.

The hydrocarbon feed is preferably a light alkane, e.g., $C_1$–$C_4$, most preferably methane or a gas containing substantial amounts of methane, e.g., natural gas.

The oxygen used in the catalytic partial oxidation process may be pure or substantially pure oxygen or an oxygen containing gas, e.g., air, or a mixture of oxygen with an inert gas. Substantially pure oxygen is preferred, and pure oxygen is still more preferred. Optionally, either the hydrocarbon feed or the oxygen stream, or both, may be mixed with steam. When steam is present, the steam to carbon ratio may be about 0 to 2.5, preferably about 0.2 to 1.5.

The ratio of hydrocarbon feed to oxygen in the reaction zone may range from about 0.45 to about 0.75 oxygen to carbon ratio, more preferably 0.45–0.55. There may be some carbon dioxide in the feed, as for example, from recycle gases or as a diluent. Generally, however, virtually no $CO_2$ is consumed, e.g., $CO_2$ conversion in the catalyst bed is less than about 10%, preferably less than about 5%. Consequently, there is essentially no synthesis gas formation via $CO_2$ reforming.

In an embodiment of the invention reaction temperature is achieved quickly at the inlet of the catalyst bed for best results. In a preferred embodiment, the process takes place in a thin reaction zone, e.g., at high (reaction) temperatures, preferably $\leq 5$ particle diameters from the bed inlet, more preferably $\leq 3$ particle diameters from the bed inlet. In this thin zone, substantially all of the oxygen is consumed, preferably $\geq 90\%$ of the oxygen is consumed, more preferably $\geq 95\%$ of the oxygen is consumed in this zone.

The hydrocarbon synthesis process, also generally known as the Fischer-Tropsch process may be exemplified by contacting synthesis gas, hydrogen and carbon monoxide, with a suitable hydrocarbon synthesis catalyst, e.g., iron, cobalt, or ruthenium, iron being a preferred catalyst for low $H_2/CO$ ratio synthesis gas, and cobalt and ruthenium, particularly cobalt, being preferred for higher, i.e., >1.0, ratios of $H_2/CO$ synthesis gas. More preferably, a non-shifting catalyst, e.g., Co, is preferred, more preferably supported cobalt. While any reactor type, fixed bed, fluid bed, slurry bed, may be employed, slurry bubble columns, where injected synthesis gas provides all or at least a portion of the energy required for maintaining the catalyst dispersed (i.e., fluidized) in the bubble column, are preferred. See, for example, U.S. Pat. No. 5,348,982 incorporated herein by reference.

The catalyst can be prepared by any technique, and conventional techniques, e.g., impregnation, incipient wetness, spray drying, etc., and may be exemplified by: placing the particulate support in an aqueous solution of a desired catalytic metal, e.g., rhodium nitrate of appropriate concentration.

To yield a catalyst with suitable metal loadings, the impregnated support is removed from the metal solution, dried (at temperatures of up to about 125° C.) to remove moisture, and calcined, usually in air, for example at temperatures of about 300 to 600° C. The metal loading is that which is catalytically effective, for example ranging from about 2–25 wt % metal, preferably about 3–20 wt % metal. The oxide is normally quickly reduced to the elemental and active form of the metal in the course of the catalytic partial oxidation process.

The catalytic partial oxidation process is conducted at suitable reaction conditions, such as those described in prior patents and patent applications. Thus, pressures may range from 1–100 atmospheres, and feed is contacted with the catalyst at temperatures ranging from 400–1200° C., preferably 500–800° C. Typically, gas hourly space velocities may range from a low of about $\geq 300{,}000$ $hr^{-1}$ to about $10{,}000{,}000$ $hr^{-1}$ or higher, preferably at least about $600{,}000$ $hr^{-1}$, more preferably at least about $1{,}000{,}000$ $hr^{-1}$, still more preferably at least about $1{,}300{,}000$ $hr^{-1}$.

The following examples will illustrate this invention, but are not meant to limit, in any way, the invention.

CATALYST PREPARATION

Supports were alumina spheres with diameters of 400, 800, 1200 and 3200 μm. Packed beds were prepared using the spherical particles and the porosity, interparticle pore diameters, and S/V as follows:

| Sample Number | Particle Diameter (Microns) | Bed Porosity Ø | Interparticle Pore Diameter $cm^{-1}$ | S/V |
|---|---|---|---|---|
| E1 | 400 | .42 | 193 | 87 |
| E2 | 800 | .44 | 419 | 42 |
| E3 | 1200 | .45 | 655 | 27.5 |
| E4 | 3200 | .48 | 1969 | 4.9 |

Where the interparticle pore diameter is calculated by $[2\emptyset/(3(1-\emptyset))][Dp]$, where Dp is the particle diameter.

Prior to use, the alumina particles were sintered to decrease the internal surface area to <15 $m^2/gm$ (i.e., 400 μm:6.9 $m^2/gm$; 800 μm:6.5 $m^2/gm$; 1200 μm:14.5 $m^2/gm$; 3200 μm:12.3 $m^2/gm$.)

Calcination involved heating from 120° C. to 1000° C. at 20° C./minute, 1000° C. to 1200° C. at 5° C./minute; calcine at 1200° C. for 6 hours.

Rhodium was applied to the sintered particles by placing them in an aqueous solution of rhodium nitrate of a concentration to obtain the desired metal loadings. The solution containing the particles was dried overnight to remove moisture, and the particles were then calcined at 600° C. for 6 hours.

| Sample | Rh, wt % |
|---|---|
| E1 | 15.2 |
| E2 | 8.3 |
| E3 | 11.1 |
| E4 | 12.0 |

For comparative purposes Rh catalyzed monoliths were also prepared. Two alumina based (92% $Al_2O_3$, 8% $SiO_2$) monoliths were used: R1 having 45 ppi (pores per inch) with an average pore diameter of 420 μm, R2 having 80 ppi with an average pore diameter of 210 μm. Surface areas of each were <1 $m^2/gm$.

Rhodium was applied to each monolith using a technique similar to that described for particles. The monoliths were impregnated with rhodium nitrate and left to dry overnight. The procedure was repeated where necessary to obtain the desired rhodium loadings. The monoliths were then calcined at 600° C. for 6 hours.

CATALYST TESTING PROCEDURES

Rh catalyzed spheres and monoliths were tested in plug flow quartz reactors. In all tests, Fiberfrax insulation (Fiberfrax Durablanket, Carborundum) covered with aluminum foil, was wrapped around the outside of quartz reactor tubes in order to prevent radial heat losses. Catalyzed spheres were supported on a quartz frit inside the quartz reactor tube. Upstream of the catalyzed spheres a ceramic fiber mat (Nextel 312, a 3M product: 62% $Al_2O_3$, 24% $SiO_2$, 14% $B_2O_3$) was used to help prevent heat losses. Catalyzed monoliths were sandwiched between two uncatalyzed, blank 45 ppi alumina monoliths (Hi Tech Ceramics: 92% $Al_2O_3$, 8% $SiO_2$) to help prevent heat losses. All monoliths were wrapped with Fiberfrax paper (Carborundum) to seal them tightly in the quartz reactor tube.

Feed gases, $CH_4$, $O_2$, and $N_2$, were controlled with Brooks mass flow controllers (5850E flow controllers). Unless specified otherwise, 20% of the feed was $N_2$ and the $CH_4/O_2$ ratio was 2 to 1. Feed gases were premixed and fed to the catalyst at ambient temperature. Pressure was maintained at 2 psig. The reactor was ignited by placing a bunsen burner on the reactant tube with feed gases flowing. When the ignition temperature was reached, the bunsen burner was removed and insulation was placed over the quartz tube containing the catalyst as described above. Product gases (CO, $H_2$, $CO_2$, $C_2H_2$, $C_2H_4$, $C_2H_6$) and unconverted feed gases ($CH_4$, $O_2$, $N_2$) were analyzed with an HP 5890, Series II gas chromatograph. All mass balances closed within ±5%, with error usually less than 3%.

EXAMPLE 1

The activity of catalyst E2 of the current invention was compared with reference catalyst R1. The table below shows methane conversion and $H_2$ and CO product selectivities for both catalysts under the following test conditions:

No feed preheat $CH_4/O_2$ feed ratio of 2.0

20% $N_2$ diluent in feed

E2 catalyst bed dimensions 14 mm D×10 mm L

R1 catalyst bed dimensions 18 mm D×10 mm L

Rh content in E2 catalyst bed: 0.154 g

Rh content in R1 catalyst bed: 0.149 g

| COMPARISON OF CATALYSTS E2 AND R1 | | | | | |
|---|---|---|---|---|---|
| Catalyst | GHSV ($hr^{-1}$) | % $CH_4$ Conversion | % $O_2$ Conversion | % $H_2$ Selectivity | % CO Selectivity |
| E2 | 190,000 | 86.1 | 100 | 93.7 | 93.0 |
| R1 | 118,000 | 78.8 | 100 | 89.5 | 95.8 |
| E2 | 430,000 | 86.4 | 100 | 95.7 | 93.1 |
| R1 | 400,000 | 68.2 | 98.4 | 78.1 | 92.6 |

The average pore diameter in each bed, i.e., using the sphere based E2 catalyst or the monolith based R1 catalyst, is the same (420 microns). Rh loadings in the reactor are also the same within <4%.

The E2 catalyst clearly shows superior performance both in terms of catalyst activity and selectivity versus the R1 catalyst, particularly at high gas hourly space velocity (GHSV). The E2 clearly has much better performance at 400,000/hr and higher. While total $C_2$ formation was <0.1% on both catalysts at low GHSV, at high GHSV the R1 catalyst made significantly more total $C_2$ products (i.e., 1.4% for R1 versus <0.1% for E2). Also, oxygen conversion was 100% on the E2 catalyst at both space velocities, but only 98.4% on the R1 catalyst at 400,000/hr.

This example demonstrates the significant improvement in catalytic partial oxidation (CPO) activity and selectivity that can be achieved through the use of a sphere based versus a monolith based catalyst design at high gas hourly space velocities.

EXAMPLE 2

The activity of catalyst E1 of the current invention was compared with reference catalyst R2. The table below shows methane conversion and $H_2$ and CO product selectivities for both catalysts under the following test conditions:

No feed preheat $CH_4/O_2$ feed ratio of 2.0

20% $N_2$ diluent in feed

E1 catalyst bed dimensions: 14 mm D×10 mm L

R2 catalyst bed dimensions: 18 mm D×10 mm L

Rh content in E1 catalyst bed: 0.276 g

Rh content in R2 catalyst bed: 0.246 g

| COMPARISON OF CATALYSTS E1 AND R2 | | | | | |
|---|---|---|---|---|---|
| Catalyst | GHSV ($hr^{-1}$) | % $CH_4$ Conversion | % $O_2$ Conversion | % $H_2$ Selectivity | % CO Selectivity |
| E1 | 230,000 | 85.7 | 100 | 95.4 | 92.2 |
| R2 | 170,000 | 82.8 | 100 | 89.8 | 95.6 |
| E1 | 350,000 | 86.3 | 100 | 95.5 | 92.5 |
| R2 | 380,000 | 53.7 | 96.6 | 57.0 | 82.9 |
| E1 | 660,000 | 86.5 | 100 | 96.2 | 92.8 |

The average pore diameter in each bed, i.e., using the sphere based E1 catalyst or the monolith based R2 catalyst, is the about the same (192 and 210 microns respectively). Rh loadings in the reactor are also about the same, within 11%.

The E1 catalyst clearly shows superior performance both in terms of catalyst activity and selectivity versus the R2 catalyst at high gas hourly space velocity (GHSV). Where conversions and selectivities of the E1 and R2 catalysts are somewhat similar at ca. 200,000/hr; the E1 clearly has much better performance at higher space velocity. Comparison of the data above 300,000/hr shows a substantial drop off in performance for the R2 catalyst, versus high activity and selectivity for the E1 catalyst up to 660,000/hr in this example.

While total $C_2$ formation was <0.1% on both catalysts at low GHSV (i.e., ca. 200,000/hr), at higher GHSV the R2 catalyst made significantly more total $C_2$ products than the E1 catalyst (i.e., 2.3% for R2 at 380,000/hr versus <0.1% for E1 at 350,000/hr and 660,000/hr).

This example again demonstrates that significant improvement in catalytic partial oxidation activity and selectivity that can be achieved through the use of a sphere based versus a monolith based catalyst design at high gas hourly space velocities.

EXAMPLE 3

This example demonstrates that a range of sphere particle sizes are useful in the current invention. Representative steady state CPO activities and selectivities are shown below at a number of gas hourly space velocities (GHSV) for catalysts E1, E2, E3, and E4 of the current invention. In all tests, no preheat was used, $CH_4/O_2$ feed ratio was 2.0 and 20% $N_2$ was used as a diluent, unless otherwise noted.

| E1 Catalyst Performance Data | | | |
|---|---|---|---|
| GHSV (hr$^{-1}$) | % CH$_4$ Conversion | % H$_2$ Selectivity | % CO Selectivity |
| 230,000 | 85.7 | 95.4 | 92.2 |
| 660,000 | 86.5 | 96.2 | 92.8 |

| E2 Catalyst Performance Data | | | |
|---|---|---|---|
| GHSV (hr$^{-1}$) | % CH$_4$ Conversion | % H$_2$ Selectivity | % CO Selectivity |
| 190,000 | 86.1 | 93.7 | 93 |
| 660,000 | 86.3 | 94.1 | 93.1 |
| 1,800,000 | 85.8 | 94.8 | 94.6 |
| 2,300,000* | 84.4 | 95.0 | 95.2 |

*This test was carried out with 15% nitrogen in the feed.

| E3 Catalyst Performance Data | | | |
|---|---|---|---|
| GHSV (hr$^{-1}$) | % CH$_4$ Conversion | % H$_2$ Selectivity | % CO Selectivity |
| 190,000 | 84.2 | 93.8 | 91.1 |
| 660,000 | 85.3 | 93.9 | 92.2 |

| E4 Catalyst Performance Data | | | |
|---|---|---|---|
| GHSV (hr$^{-1}$) | % CH$_4$ Conversion | % H$_2$ Selectivity | % CO Selectivity |
| 94,000 | 81.0 | 95.0 | 91.8 |
| 166,000 | 79.2 | 91.2 | 92.4 |
| 400,000 | 70.5 | 84.8 | 90.7 |

Except on the E4 catalyst, total $C_2$ selectivity was <0.1% and oxygen conversion was 100% within experimental error in all tests described above. For the E4 catalyst: at 94,000/hr, total $C_2$ selectivity was <0.1% and oxygen conversion was 99.5%; at 166,000/hr, total $C_2$ selectivity was <0.1% and oxygen conversion was 98.8%; and at 400,000/hr, total $C_2$ selectivity was <1.05% and oxygen conversion was 97.1%.

EXAMPLE 4

This example demonstrates that catalyst beds containing Rh catalyzed spheres of more than one size are also effective CPO catalysts. The table below shows data on a 50/50 mixture (by weight) of catalysts E1 and E3. In these tests, no preheat was used, CH$_4$/O$_2$ feed ratio was 2.0 and 20% N$_2$ was used as a diluent. Total amount of Rh in the reactor used for these mixed bed runs was 0.223 g.

| (50% E1 + 50% E3) Mixed Bed Catalyst Performance Data | | | |
|---|---|---|---|
| GHSV (hr$^{-1}$) | % CH$_4$ Conversion | % H$_2$ Selectivity | % CO Selectivity |
| 190,000 | 83.8 | 93.2 | 90.8 |
| 660,000 | 85.0 | 95.6 | 91.5 |

We claim:

1. A catalytic partial oxidation process comprising contacting a $C_1$–$C_4$ hydrocarbon feed with oxygen or an oxygen containing gas with a bed of particulate, supported, Group VIII metal catalyst, the support having a surface to volume ratio of about 15–230 cm$^{-1}$, the average BET surface area being <m$^2$/g, and the particle size being about 200–2000 microns diameter.

2. The process of claim 1 wherein substantially all of the oxygen is consumed in a zone of ≦5 particle diameters from the feed inlet to the catalyst bed.

3. The process of claim 2 wherein ≧90% of the oxygen is consumed in the zone.

4. The process of claim 2 wherein the surface to volume ratio is 18–140 cm$^{-1}$.

5. The process of claim 2 wherein the space velocity is ≧300,000 hr$^{-1}$.

6. The process of claim 2 wherein the space velocity is ≧600,000 hr$^{-1}$.

7. The process of claim 2 wherein the metal is rhodium.

8. The process of claim 2 wherein the support has a substantially stable surface area at reaction conditions.

9. The process of claim 8 wherein the support is selected from the group consisting of refractory metal oxides, rare earth modified refractory metal oxides, alkali earth metal modified refractory metal oxides.

10. The process of claim 2 wherein the feed comprises methane.

11. The process of claim 9 wherein a synthesis gas is produced and the synthesis gas is a feed to a cobalt catalyzed Fischer-Tropsch process.

* * * * *